United States Patent [19]

Parrott et al.

[11] Patent Number: 4,821,770

[45] Date of Patent: Apr. 18, 1989

[54] SOLENOID VALVE ASSEMBLY

[75] Inventors: Richard M. Parrott, Anderson; Yuchi P. Peng, Noblesville, both of Ind.; William J. Ricketts, Fond du Lac, Wis.

[73] Assignee: General Motors Corporation, Detroit, Mich.

[21] Appl. No.: 138,179

[22] Filed: Dec. 28, 1987

[51] Int. Cl.$^4$ .................................. F15B 13/044
[52] U.S. Cl. .................... 137/596.17; 303/119
[58] Field of Search .............. 137/596.17; 303/119

[56] References Cited

U.S. PATENT DOCUMENTS

| | | | |
|---|---|---|---|
| 3,842,860 | 10/1974 | Stampfli | 137/596.17 |
| 4,337,794 | 7/1982 | Yamanaka et al. | 137/596.17 |
| 4,561,701 | 12/1985 | Fujii et al. | 303/119 |
| 4,640,558 | 2/1987 | Nomura et al. | 303/119 |
| 4,674,536 | 6/1987 | Warrick | 137/596.17 X |
| 4,679,589 | 7/1987 | Inden et al. | 137/596.17 |
| 4,691,969 | 9/1987 | Maehara | 303/119 X |

Primary Examiner—Gerald A. Michalsky
Attorney, Agent, or Firm—Ernest E. Helms; D. D. McGraw

[57] ABSTRACT

A valve assembly having normally opened and normally closed valves controlled by solenoids to provide various connected and disconnected arrangements in a fluid system. It is particularly useful in a wheel lock control or anti-skid brake system (ABS).

5 Claims, 1 Drawing Sheet

SOLENOID VALVE ASSEMBLY

The invention relates to a valve assembly having normally opened and normally closed valves controlled by solenoids to provide various connected and disconnected arrangements in a fluid system. It is particularly useful in a wheel lock control or anti-skid brake system (ABS). For example, it may be readily used with the inventions disclosed and claimed in U.S. patent application Ser. No. 138,168 entitled "Isolation Valve Bypass for Master Cylinder Brake Fluid in Wheel Lock Control System", filed on even date herewith and assigned to the common assignee; and in U.S. patent application Ser. No. 138,178, entitled "Modulator with Two-Stage Orificed Master Cylinder Bypass Valve", filed on even date herewith and also assigned to the common assignee.

The two solenoid control valves are preferably placed in a single package and arranged in geometric series connection. The valve assembly preferably has four functional modes with three fluid ports. The four functional modes are controlled by energizing or deenergizing the solenoids in various combinations. When used in a system such as that of the above identified U.S. patent applications, there is a pressure input port, a pressure output port, and a pressure release port or exhaust port which releases fluid directly to a reservoir. The fluid connection between the input port and the output port, and the fluid connection between the output port and the pressure release port, are within the valve assembly. The assembly preferably has a common chamber made of two thin-walled stainless steel tubes and a center channeled plunger stop to which the two tubes are attached at each end thereof. The channel arrangement provides the shortest fluid passage from the pressure output port to the pressure release port within the valve assembly while having a minimum fluid energy loss.

It is another feature of the invention that the electrical connection and the direction of the coil windings of the two solenoids assist in forming a continuous enhancible magnetic flux pattern so that the resulting magnetic fields can provide enhanced performance.

It is a feature of the invention that the center thin-wall stainless steel tubes act as chambers which contain the valve plungers, which are also solenoid armatures, with pressurized fluid being within the tubes under certain conditions. The arrangement avoids axial loading against the thin wall tubes and the tubes are strengthened so as to contain the fluid pressure therein by the position of the solenoid coils and coil housings immediately about each tube.

It is another feature of the invention to provide a triple cascade orifice configuration to function effectively and quietly in high pressure application. The triple cascade orifice is positioned between the pressure input port and the pressure output port and includes three orifices provided in series, the third orifice being established by the opening between a ball valve and the cylindrical wall in which the ball valve is located when the ball is unseated so as to permit flow therepast. This arrangement provides sufficient fluid flow at high compressed fluid pressures with the least pressure differential across each of the individual orifices, tending to eliminate fluid cavitation and to alleviate induced noise resulting therefrom.

In the drawing

Figures 1, 2:
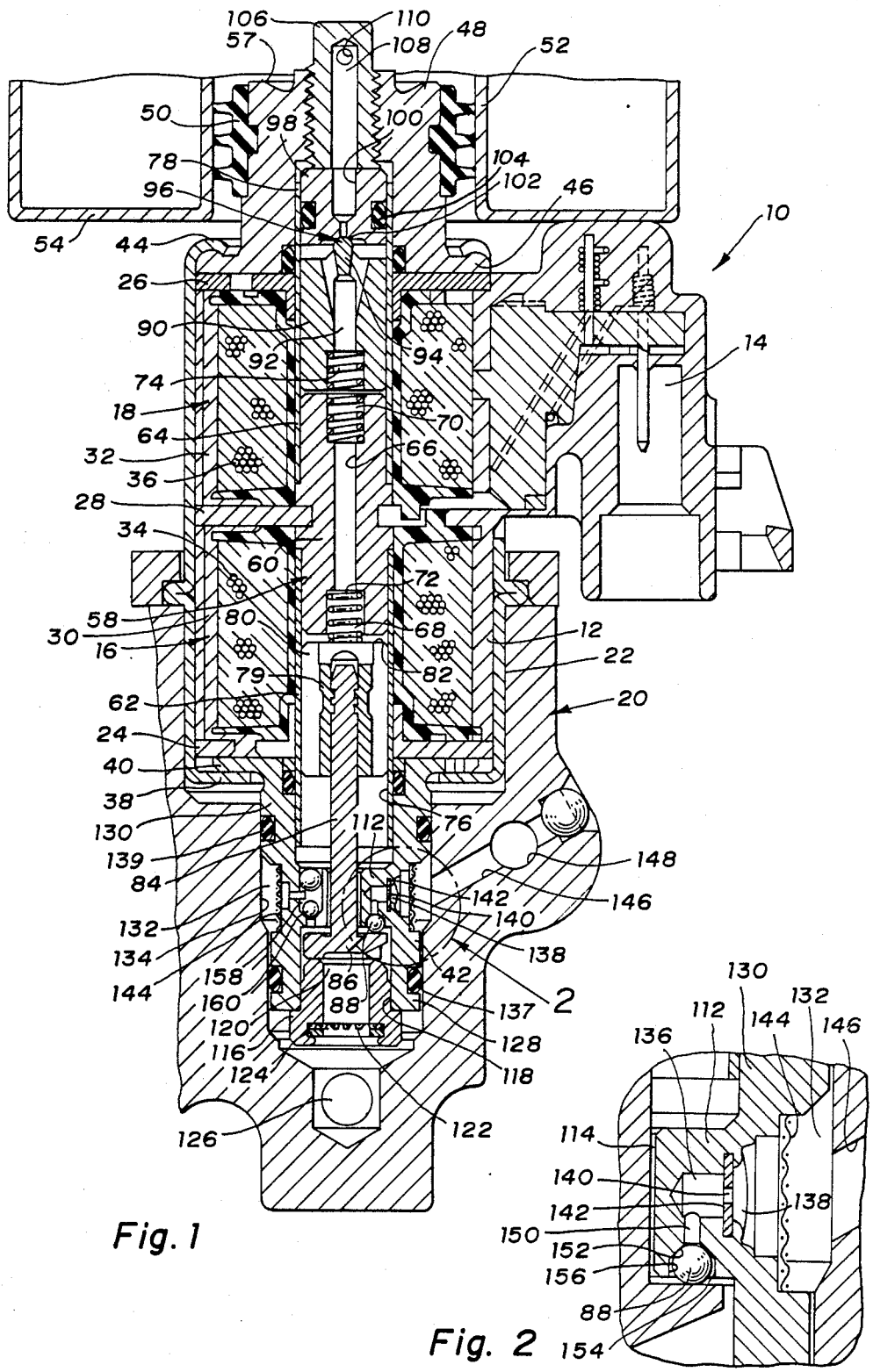
FIG. 1 is a cross-section view with parts broken away showing the solenoid valve assembly embodying the invention.
FIG. 2 is an enlarged fragmentary portion of FIG. 1 as indicated by circle 2 on FIG. 1.

The solenoid valve assembly 10 is illustrated as having a housing section 12 which includes the electrical connector 14. It also houses the two solenoid assemblies 16 and 18 as well as at least portions of the valves and fluid passages controlled thereby. Assembly 10 also includes a housing section 20 which houses a portion of the solenoid assembly 16 as well as the normally open valve controlled by that solenoid. The two solenoids are illustrated as being contained within a solenoid case assembly 22. The solenoid assemblies 16 and 18 are also associated with end plates 24 and 26, respectively, as well as the center or plunger stop support plate 28. Solenoid coil frames 30 and 32, respectively containing solenoid assemblies 16 and 18, engage the plates 24, 26 and 28 and cooperate therewith to bear the axial load in compressive loading conditions so that the axial load is not carried through the solenoid coil 34 of solenoid assembly 16 or the solenoid coil 36 of solenoid assembly 18. Solenoid assembly 16 has one end 38 of case assembly 22 crimped over a flange 40 of the normally open valve housing 42. The other end 44 of case assembly 22 is similarly crimped about a flange 46 of the solenoid assembly cap 48. Cap 48 is illustrated as being provided with a multiple land sealing grommet 50 which extends through a tube-like bottom portion 52 of the reservoir 54 so that the upper end 56 of cap 48 opens into the reservoir 54 and the grommet 50 effectively seals between the cap 48 and the reservoir portion 52. Reservoir 54 is preferably the reservoir for the master cylinder and the booster of the brake system schematically shown in the above applications, as well as for the ABS system of which the solenoid valve assembly herein disclosed and claimed is preferably a part.

The plunger stop assembly 58 includes the stop 60 and the stainless steel tubes 62 and 64. Stop 60 has a through passage or channel 66 formed axially therethrough and having slightly enlarged passage ends 68 and 70. A spring 72 is positioned in passage end 68 and abuts the shoulder formed at the bottom portion thereof. Another spring 74 is similar positioned in passage end 70. The center portion of plunger stop 60 is suitably slotted or grooved so as to receive at least a part of plate 28 therein to anchor and locate the plunger stop assembly 58 axially and radially. The outer end 76 of tube 62 extends into the valve housing 42, and the outer end 78 of tube 64 extends into the solenoid assembly cap 48. The cylindrical spaces outwardly of the plunger stop and the ends 76 and 78 of the stainless steel tubes provide cylinders. The inner ends of the stainless steel tubes are secured to the plunger stop 60 in any suitable manner, for example by welding. The electrical connector 14 has suitable terminals and connecting wires arranged for energization and deenergization of each of the solenoid coils 34 and 36. These coils are wound in opposite directions for reasons to be described. Solenoid assembly 16 has a solenoid armature or plunger 79 which is reciprocably received within tube 62 and has axially extending passages 80 which permit fluid flow therepast. Spring 68 is in engagement with the inner end 82 of plunger 79 so as to urge that plunger outwardly of the tube 62. A rod 84 has one end secured to plunger 79, with the other end extending outward of tube 62 and into a portion of the valve housing 42. Rod 84 is provided with a head 86 which controls the condition of the normally open valve 88, described in greater detail below.

Solenoid assembly 18 has an armature or plunger 90 reciprocably received for axial movement in tube 64. Spring 74 engages plunger 90 and urges that plunger outwardly of tube 64. Plunger 90 also has a passageway 92 formed therethrough which is in continuous fluid communication with passage or channel 66 of the plunger stop 60. Plunger 90 is formed to provide a valve head 94 which is a part of the normally closed valve 96. A seat member 98 is sealingly mounted in the outer end 78 of tube 64 and has a restrictive orifice passageway 100 formed therethrough. The end of passageway 100 facing valve head 94 is formed as a valve seat 102, and valve head 94 is normally in engagement with valve seat 102 to maintain passageway 100 closed. The seat member 98 is provided with a seal 104 which prevents leakage between the seat member and the inner wall of tube 64. The other end of seat member 98 is engaged by the inner end of a plug 106 which is threaded into cap 48 so as to provided the appropriate axial position of seat member 98. Plug 106 has a recess 108 formed therethrough in continuous fluid communication with passageway 100. The upper end of recess 108 is provided with a port 110 which is the release port of the assembly. Port 110 opens into the interior of reservoir 54. It can be readily seen that any fluid passing through passageway 100 and recess 108 will then be discharged directly into the reservoir.

Valve housing 42 has a center wall 112 provided with a passageway 114 extending axially therethrough. Rod 84 extends through this passageway but is somewhat smaller in diameter than the diameter of the passageway so that fluid communication is maintained between the interior of tube 62 and the other side of the center wall 112. On the other side of wall 112 is located the rod head 86 which is axially spaced slightly from that wall. A plug 116 is inserted in the outer opening 118 of valve housing 42 and limits axially outward movement of the valve head 86. Plug 116 has a passage 120 extending axially therethrough, with a filter 122 held in the outer end of passage 120 by a retainer 124. Thus passage 120 is connected through the filter 122 to the pressure output port 126 provided in a part of housing section 20 in which the valve housing 42 and the plug 116 are mounted.

The valve housing center wall 112 is of a described diameter in relation to the housing ends 128 and 130 so that an annular chamber 132 is formed thereabout, this chamber being defined on its outer circumference by a portion of the cylinder wall 134 of the cylinder-like recess in housing section 20 into which the valve housing 42 is mounted. Suitable seals 137 and 139 are respectively provided on valve housing ends 128 and 130 so as to seal the annular chamber 132 relative to the pressure outlet port 126 and the portion of housing 20 containing a part of the solenoid assembly 16.

As shown more clearly in FIG. 2, a L-shaped passage 136 is formed in the valve housing center wall 112 with one end 138 opening into the annular chamber 132 through a first orifice 140 formed in orifice plate 142. Plate 142 is mounted in the end 138 of passage 136. An annular filter 144 is secured in the annular chamber 132 so that all fluid flowing from the chamber into passage 136 first passes through that filter. It is noted that annular chamber 132 is in continuous fluid communication with a passage 146 in housing section 20 which is directly connected to the pressure input port 148. Thus operating pressure is supplied to the valve assembly via pressure input port 148 and is always contained in the annular chamber 132. Passage 136 has another portion thereof formed to provide as second orifice 150 which extends parallel to the axis of the valve housing 42 and opens to provide a valve seat 152 and a valve cylindrical wall 154, which in turn is fluid connected to the passage 120 and outlet port 126 through filter 122. The normally open ball check valve 80 (axially spaced from the solenoid 16) is positionally captured within cylindrical wall 154 so as to be engageable with tapered valve seat 152. When the rod head 86 is positioned downwardly as seen in FIG. 1, solenoid coil 34 being deenergized, the head is sufficiently spaced from the center wall 112 to permit the ball check valve 88 to be spaced from its seat 152 and therefore to permit flow through the passage 136 including orifices 140, 150 and 156. Orifices 150 and 156 are continuations of passage 136. Orifice 156 is defined by the annular space around the ball check valve 88 and the surface of cylindrical wall 154. When the solenoid coil 34 is electrically energized, it acts on plunger 78 to move the rod 84 and its head 86 upwardly as seen in FIG. 1 to force valve 88 into engagement with its valve seat 152, holding the valve closed.

Another L-shaped passage 158 in the valve housing center wall 112 connects the annular chamber 132 with the output port 126 at all times. Ball check valve 160 prevents reverse flow from the annular chamber 132 to the output port 126. A portion of passage 158 adjacent the valve seat of check valve 160 is an orifice which will permit flow from the pressure output port 126 to the pressure input port when the pressure output port 126 is trying to be at a greater valve than that of the input port. Thus valve 160 and passage 158 prevent the output pressure 126 from being greater at any time than that of the pressure at input port 148.

The three orifices 140, 150 and 156 between the input 148 and the output port 126 provide a triple cascade orifice configuration which functions effectively and quietly in high pressure applications. At the same time it permits a sufficiently high fluid flow at high compressed fluid pressures with the least pressure differential across each individual orifice, hence minimizing fluid cavitation and alleviating noise induced from such cavitation.

The normal, deenergized, position of the valves in the assemblies is the position for normal pressure apply from the pressure input port 148 to the pressure output 126 through the normally opened valve 88. This occurs when both solenoid coils 34 and 36 are deenergized so that valve 88 is opened and valve 96 is closed. Input pressure will also be conducted through the passageway 114 and past plunger 79, into passage 66 and passageway 92. However, the normally closed valve 96 prevents it from being conducted to the reservoir 54 through port 110.

In the output pressure hold mode the solenoid coil 34 controlling the normally open valve 88 is energized, moving plunger 79 toward plunger stop 60, and moving rod head 86 so that it engages the ball valve 88 and moves that valve, holding that valve seated against its valve seat 152. This therefore closes off the input pressure in port 148, and holds the output port pressure in port 126 to the pressure therein at the time valve 88 was closed. Since valve 96 remains closed, the pressure in the output port 126 neither decreases nor increases.

When the pressure in the output port is to be released to a lesser pressure, or even to zero pressure, the solenoid coils 34 and 36 are both energized, closing or keeping valve 88 closed as in the previous state, and moving plunger 90 toward the plunger stop 60 to open valve 96. The output port pressure is then connected through passage 126 and passage way 114 as well as passage 66 and passageway 92 to the restrictive orifice passage 100 which controls its rate of flow, after which it enters the reservoir 54 through the release port 110. The pressure apply mode may be reinstituted by deenergizing both solenoid coils, returning the valves to their respective normally open and normally closed positions.

When there is trapped air in the system a trapped air bleed mode is established by deenergizing coil 34 if it is energized, and energizing coil 36. This opens both valves 88 and 96, allowing the system to be bled, with the flow of pressure from the input port assisting in flushing any trapped air out of the assembly. Once the assembly is bled, both solenoids are then normally deenergized to return the assembly so that it may again permit the the application of pressure from input port 148 to output port 126.

The embodiments of the invention in which an exclusive property or privilege is claimed are defined as follows:

1. A solenoid valve assembly having a housing, a pressure inlet, a pressure outlet, and an exhaust port, said assembly comprising:

a first solenoid having a first solenoid actuatable plunger;

a second solenoid having a second solenoid actuatable plunger in axial alignment with said first solenoid and plunger;

a plunger stop and guide member comprising a stop element positioned axially intermediate said plungers and first and second tubular guides secured to and extending from said stop element with said first plunger and said second plunger being respectively reciprocably received therein, said stop element having an axially extending bore therethrough and oppositely extending first and second plunger springs respectively urging said first and second plungers axially away from said stop element;

a first valve housing having normally open first valve means, axially spaced from said first solenoid, therein fluidly intermediate said pressure inlet and said pressure outlet and having a valve closing member secured to said first plunger and movable therewith when said first solenoid is energized to close said first valve means;

passage means in said first valve housing in axial alignment with said first plunger and maintaining continuous fluid communication between said pressure outlet and said axial passage in said stop element through said first tubular guide;

normally closed second valve means including a valve seat in said second tubular guide in axially spaced relation to said stop element with said second plunger positioned axially therebetween, a valve element formed on said second plunger and normally seated on said valve seat to close said second valve means and axially movable when said second solenoid is energized to open said second valve means, said second plunger having a passage therethrough providing fluid communication with said stop element axial passage to said valve element, and a restrictive orifice passageway extending through said valve seat and in fluid communication with said release port;

said solenoids being selectively energizable and deenergizable to selectively open and close said first and second valve means and thereby control the fluid pressure in said outlet in pressure apply, pressure hold, pressure release, and air bleed modes.

2. The assembly of claim 1, said first valve housing further having a check valve therein between said pressure inlet and said pressure outlet and acted on by pressures therein to open when pressure in said pressure outlet exceeds the pressure in said pressure inlet to limit the pressure in said pressure outlet to the pressure in said pressure inlet, and to be closed whenever the pressure in said pressure inlet exceeds the pressure in said pressure outlet.

3. The assembly of claim 1, said first valve housing having a triple cascade orifice arrangement fluidly intermediate said pressure inlet and said pressure outlet defined by a thin plate first orifice, a restrictive flow passageway second orifice, and a ball valve captured within a taper which is at least a part of said valve means, the opening of said ball valve in said taper providing a restrictive flow third orifice, said triple cascade orifice arrangement providing sufficient fluid flow at high fluid pressures at said pressure inlet and stepped pressure differentials across each of said first and second and third orifices, substantially eliminating fluid cavitation and alleviating induced noises resulting therefrom.

4. A valve assembly having first and second oppositely wound axially aligned selectively electrically energizable and de-energizable solenoid coils having their adjacent ends in juxtaposed relation, first and second coaxially positioned solenoid armature plungers respectively received within said first and second solenoid coils, each of said solenoid armature plungers having a valve opening and closing means thereon, a normally open first valve closed by one of said valve opening and closing means when said first solenoid coil is electrically energized to move said first solenoid armature plunger toward said second armature plunger, a normally closed second valve opened by the other of said valve opening and closing means when said second solenoid coil is electrically energized to move said second solenoid armature plunger toward said first armature plunger, a plunger stop extending between and received within said solenoid coils, first and second valve housings positioned in axial alignment with said plungers outside of but adjacent to the opposite ends of said solenoid coils and respectively having said first and said second valves therein, a hydraulic fluid pressure inlet fluid connected with said first valve on the inlet side thereof and a hydraulic fluid pressure outlet fluid connected with said first valve on the outlet side thereof, said second valve having the inlet side thereof continuously fluid connected with the outlet side of said first valve, and a pressure release port continuously fluid connected with the outlet side of said second valve;

said assembly operating in a first mode with both solenoid coils deenergized and said first valve open and said second valve closed to conduct pressurized hydraulic fluid pressure from said hydraulic fluid pressure inlet to said hydraulic fluid pressure outlet and adapted to apply hydraulic fluid pressure from said hydraulic fluid pressure outlet to a hydraulic fluid pressure operated means;

said assembly operating in a second mode with said first solenoid coil electrically energized and said second solenoid coil deenergized and both of said first and second valves closed to hold the hydraulic fluid pressure in said hydraulic fluid pressure outlet at the pressure present therein when said first valve closed;

said assembly operating in a third mode with both of said solenoid coils electrically energized and said first valve closed and said second valve open to release hydraulic fluid pressure from said hydraulic fluid outlet;

and said assembly operating in a fourth mode with said first solenoid coil deenergized and said second solenoid coil electrically energized and both of said first and second valves open to bleed air from said assembly and from said hydraulic fluid pressure inlet and outlet and thus being adapted to also bleed air from the hydraulic fluid in any hydraulic devices which may be secured to said hydraulic fluid pressure inlet and outlet.

5. The assembly of claim 4, the direction of coil windings in said solenoid coils and the direction of electrical currents flowing therethrough when both of said solenoid coils are electrically energized being such that the magnetic flux patterns thereof at their adjacent ends enhance each other.

* * * * *